United States Patent Office 3,565,879
Patented Feb. 23, 1971

3,565,879
DIHALOCARBENE ADDUCT OF ROSIN DERIVATIVES
Walter H. Schuller, Jacob C. Minor, and Ray V. Lawrence, Lake City, Fla., assignors to the United States of America as represented by the Secretary of Agriculture
No Drawing. Filed Sept. 6, 1968, Ser. No. 758,119
Int. Cl. C09f 1/04
U.S. Cl. 260—103                                    2 Claims

ABSTRACT OF THE DISCLOSURE

This invention relates to a process for reacting the esters of rosin. More particularly, this invention relates to a method for reacting the esters of rosin with dihalocarbenes to give adducts which are considerably more stable to air oxidation due to the destruction of the conjugated system of unsaturation in the resin acids, in particular of abietic acid.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a method for reacting the esters of rosin with dihalocarbenes to give adducts which are considerably more stable to air oxidation due to the destruction of the conjugated system of unsaturation in the resin acids, in particular of abietic acid.

The procedure used in the present invention to generate the dihalocarbene in-situ involves the reaction of sodium hydroxide, in pellet form, with chloroform at from 20° C. to 160° C. This method has been described by Gene C. Robinson, Tetrahedron Letters, 22, 1749–1752 (1965).

It has been found definitely advantageous to carry out the reaction below 30° C. in order to minimize hydrolysis of the rosin ester and in order to exert more control over the reaction. This is in contrast to Robinson, who recommends a temperature of 96° C. for the reaction. We have found that the reaction, on warming, is exothermic and will increase to 155° C. if not controlled, with loss of chloroform through the condenser.

It has also been found advantageous to use a large excess of sodium hydroxide and chloroform to insure as complete a reaction as possible between the rosin ester and the in-situ generated dichlorocarbene. In the present case a ten to one molar excess of in situ generated dichlorocarbene to methyl ester of rosin was used. Somewhat smaller excesses can be used, e.g. three to one or five to one. The reaction between the chloroform and sodium hydroxide occurs as follows:

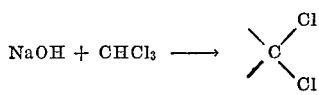

One can use a fourfold excess of sodium hydroxide pellets over the amount of chloroform used (the chloroform being present in from three to 20 molar equivalents in excess over the methyl ester of rosin). The preferred range of reagents is used in Example 1, namely 0.12 moles of methyl rosin to 1.2 moles of sodium hydroxide to 1.2 moles of chloroform.

Increased stability to air oxidation is of considerable importance when esters of rosin are used as components of adhesives. The dihalocarbene adduct presumably stabilizes the rosin ester by destroying the conjugated unsaturation of the methyl abietate present [see J. C. Minor, W. H. Schuller, and R. V. Lawrence, Tappi, 48, 541 (1965)], to give a compound of the following presumed structure:

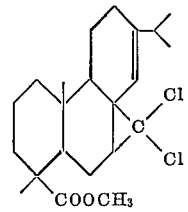

This structure is supported by the absence of a peak in the ultraviolet absorption region of 241 mμ and by the chlorine analysis on the product.

EXAMPLE 1

A solution of 39 g. of the methyl ester of rosin (0.123 mole) in 50 mls. of tetraglyme (dimethyl ether of tetraethylene glycol) is placed in a round-bottomed flask equipped with a high speed mechanical stirrer, a thermometer, a dropping funnel, and a reflux condenser. Sodium hydroxide pellets (48 g.; 1.2 moles) are added and stirring started. Chloroform (96 ml.; 1,2 moles) is slowly dripped in over a 3 hour period during high speed stirring. The temperature is maintained below 29° C. by means of external cooling when necessary. High speed stirring is then continued at room temperature for 10 hours. The mixture is dissolved in ether, neutralized to pH 3 with 20% aqueous phosphoric acid, the aqueous layer ether extracted and the combined aqueous layers water washed until neutral. Titration of an aliquot showed the presence of 6.9% of free resin acid. (Titration of the starting methyl ester of rosin showed the presence of 4.2% of free resin acid.) The ether solution is washed with 2% sodium hydroxide solution to remove free acids and then water washed, dried over anhydrous sodium sulfate. The ether solution is passed through a column containing 55 g. of a coarse grade of activated carbon (Darco) to remove color bodies. The ether is then stripped off under reduced pressure to give a light yellow syrup of the dichlorocarbene adduct of the methyl ester of rosin. Analysis by means of gas liquid chromatography on a 15 ft. Versamide-900 column at 240° C. indicated that no free (unreacted) palustric, levopimaric, neoabietic, or abietic acid was present. Also, the g.l.c. analysis indicated most of the pimaric acid and isopimaric acid were absent (had reacted) and that about half of the dehydroabietic acid had reacted also. Chlorine analysis, found: 16.77%, calc'd for addition of one CCl₂ group per molecule of resin acid present: 17.8%. The ultraviolet absorption spectrum indicated no characteristic absorption from 230 mμ to 320 mμ again showing that most if not all, of the conjugated dienic resin acids present had reacted.

The probable structure of the dichlorocarbene adduct of the methyl ester of abietic acid is as follows:

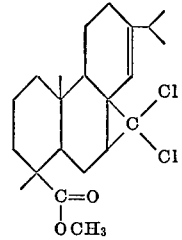

EXAMPLE 2

A piece of filter paper (Whatman No. 1) 6 inches in diameter, was impregnated with an ether solution of the methyl ester of rosin used as the starting material of Example 1. After drying in vacuo to remove the ether it was equilibrated in air and weighed.

Another piece of the same kind and size of filter paper was impregnated with an ether solution of the dichlorocarbene adduct of the methyl ester of rosin, the ether removed by drying in vacuo, then equilibrated in air and both pieces of impregnated paper hung in air and weighed periodically. After 41 days, the weight gain due to oxidation for the methyl rosin treated paper, based on the resin present, was 10.3%. After 83 days it was 10.8%. The weight gain for the dichlorocarbene adduct was only 4.0% after 41 days and 4.13% after 83 days. Thus, the reaction product of the dihalocarbene and the methyl ester of rosin was very much more stable towards air oxidation than the starting material.

EXAMPLE 3

The dichlorocarbene adduct of the methyl ester of rosin is dissolved in acetone and applied to anesthetized German cockroaches at 1% concentration. The roaches were placed on a paper towel and one drop of solution pipetted onto the roach. The insect then was turned over and another drop pipetted on. The runoff was caught on the towel and the insect immediately removed to a mason jar. Solvent controls were run as well as standard insecticides. The insects dead were noted after 24 hours. The result for the compound in question was excellent, namely, an 84% kill under the conditions described, in 24 hours. The solvent alone (blank run) resulted in a zero percent kill under the same conditions.

We claim:
1. A process for producing a rosin ester-dihalocarbene adduct which comprises:
(a) adding with stirring to about 1.00 parts of the methyl ester of rosin dissolved in about 1.30 parts of tetraglyme and 1.23 parts of sodium hydroxide,
(b) dripping slowly over about a 3-hour period about 3.69 parts of chloroform while maintaining a temperature below 29° C.,
(c) stirring the mixture at room temperature for about 10 hours, and
(d) isolating a dichlorocarbene adduct.
2. A compound represented by the formula

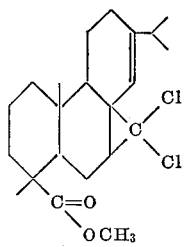

References Cited
FOREIGN PATENTS
461,476   11/1949   Canada _____ 260—103
1,363,460   5/1964   France _____ 260—648

OTHER REFERENCES

G. C. Robinson, Tetrahedron Letters, vol. 22, pages 1749–1752 (1965).

G. C. Harris, Rosin and Rosin Derivatives, Reprint of pages 793–794 of Encyclopedia of Chemical Technology (1953).

J. C. Minor et al., Tappi, vol. 48, pages 541–542 (1965).

DONALD E. CZAJA, Primary Examiner

E. C. RZUCIDLO, Assistant Examiner

U.S. Cl. X.R.

260—107, 468.5; 424—314